United States Patent [19]
Wehrmann et al.

[11] Patent Number: 6,143,823
[45] Date of Patent: *Nov. 7, 2000

[54] THERMOPLASTICALLY PROCESSABLE THERMOTROPIC MOLDING COMPOUNDS

[75] Inventors: Rolf Wehrmann; Alexander Karbach, both of Krefeld; Thomas Elsner, Düsseldorf; Peter Tappe, Krefeld, all of Germany

[73] Assignee: Bayer AG, Leverkusen, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/701,730

[22] Filed: Aug. 22, 1996

Related U.S. Application Data

[63] Continuation of application No. 08/477,279, Jun. 7, 1995, abandoned, which is a continuation of application No. 08/132,326, Oct. 6, 1993, abandoned.

[30] Foreign Application Priority Data

Oct. 19, 1992 [DE] Germany .............................. 42 35 136

[51] Int. Cl.[7] .............................. C08L 67/03; C08L 67/04
[52] U.S. Cl. .................................. 525/66; 525/67; 525/68; 525/132; 525/146; 525/147; 525/148; 525/152; 524/275; 524/437; 524/439; 524/441; 524/444; 524/447; 524/449; 524/450; 524/456; 524/508

[58] Field of Search ................................. 525/68, 132, 66, 525/67, 148, 146, 147, 152; 524/275, 437, 439, 441, 444, 447, 449, 450, 456, 508

[56] References Cited

U.S. PATENT DOCUMENTS

| | | |
|---|---|---|
| 3,416,990 | 12/1968 | Robinson . |
| 3,437,550 | 4/1969 | Paul . |
| 3,483,276 | 12/1969 | Mahlman . |
| 4,451,611 | 5/1984 | Cincotta ..................................... 525/51 |
| 5,162,434 | 11/1992 | Pielartzik .................................. 525/66 |
| 5,242,981 | 9/1993 | Izumi ....................................... 525/133 |

FOREIGN PATENT DOCUMENTS

| | | |
|---|---|---|
| 0484105 | 5/1992 | European Pat. Off. . |
| 0492976 | 7/1992 | European Pat. Off. . |
| 3900714 | 7/1990 | Germany . |

OTHER PUBLICATIONS

Alger, M. *Polymer Science Dictionary*, p 5, Chapman & Hall (1997).

*Primary Examiner*—Patricia A. Short
*Attorney, Agent, or Firm*—Connolly Bove Lodge & Hutz

[57] ABSTRACT

Thermoplastically processable thermotropic molding compounds of thermotropic polycondensates and 0.05 to 5% by weight functionalized polymers, such as for example functionalized polybutadiene oils, polyethylene or polypropylene.

20 Claims, No Drawings

THERMOPLASTICALLY PROCESSABLE THERMOTROPIC MOLDING COMPOUNDS

This application is a continuation, of application Ser. No. 08/477,279 filed on Jun. 7, 1995, now abandoned, which is a continuation, of application Ser. No. 08/132,326 filed on Oct. 6, 1993, now abandoned.

This invention relates to new thermoplastically processable thermotropic molding compounds of polycondensates and other functionalized polymers, to a process for the production of these compounds and to their use for the production of moldings.

The thermoplastically processable thermotropic molding compounds according to the invention have improved mechanical properties, such as for example modulus, strengths and impact strengths.

Thermotropic polycondensates, such as for example polyesters, polyester amides and polyester carbonates, are known and are described in the literature, see L. Chapoy in Recent Advances in Liquid Crystalline Polymers, Elsevier, Appl. Sci. Publishers, 1985.

It is known that thermotropic polymers can readily be oriented in the melt by shear and stretching flows. This results in high molecular orientation in the solid. Accordingly, the moldings show anisotropic mechanical properties with high moduli of elasticity in tension, tensile strengths and low elongations and poor impact strength.

Accordingly, the problem addressed by the present invention was to provide moldings of thermotropic polycondensates having improved property distribution without drastic reductions in strength and rigidity.

The crosslinking of polymers at the molecular level is already known and is used in the production of thermosets. The crosslinked products often have high thermal and chemical resistances. In many cases, however, they are not thermoplastically processable and show only minimal elongation and unsatisfactory impact strength. Examples of such systems are the known epoxy resins.

In addition to these systems, elastomers represent another group of polymers. Although they show high elongation at break and good energy absorption, for example, they often have inadequate heat resistance and a low heat distortion temperature and long-term service temperature.

In order to achieve thermoplastic processability, crosslinking would have to take place at the super-molecular level. Polymers are disintinguished by differently pronounced superstructures (H. G. Elias in Makromoleküle, Vol. 1; 1990, Hüthig & Wepf Verlag). Folded crystals and micellar crystals are formed. Between the crystalline regions there are amorphous regions which do not have a long-range order like the crystals. In the event of mechanical stressing, the amorphous regions represent weak spots which can be strengthened by crosslinking. In the case of the micelles, the molecules are mainly oriented so that the amorphous regions do not contain any of the molecular back-folds to be found in the folded crystals. In this case, too, the amorphous weak spots can be bridged by crosslinking. Partially crystalline polymers form a spherolithic superstructure from the folded crystals. The interfaces between the spheroliths also form weak spots in the structure because, if the molecular weight is too low, the cohesion between the spheroliths is inadequate and cracks are formed even under light loads so that corresponding moldings fail prematurely.

The superstructures corresponding to the micelle crystals are fibrillar structures in the molecule direction. The interfibrillar regions are also weak spots in the event of mechanical stressing and could be strengthened by molecular bridging. The sperolithic structures occur in all partially crystalline polymers with flexible molecules (H. B. Elias in Makromoleküle, Vol. 1; 1990, Hüthig & Wepf, Verlag).

Thermotropic polycondensates in particular form another layer-like superstructure through agglomeration of the fibrils. These layer structures are also weak spots which could be accessible to crosslinking. By virtue of the layer structure, moldings acquire particularly high impact strength although this can only be utilized if the layers are adequately coupled to one another.

Examples of flexible molecules are polyethylene, polypropylene, polyester, polycarbonate, polyphenylene sulfide, polyamides, etc. The fibrillar structures occur in stiff-chain molecules. These molecules form mesophases and have liquid crystalline properties in the melt. Moldings of thermotropic polycondensates have very low transverse strengths and are therefore unsuitable for numerous technical applications. Examples of liquid crystalline polymers are LC polyesters, LC polyester carbonates, LC polyester amides, etc.

The present invention relates to modified thermoplastically processable thermotropic molding compounds of
A) thermotropic polycondensates and
B) functionalized polymers,
the percentage content of component B) being from 0.02 to 5% by weight (based on 100% by weight of component A).

The thermotropic polycondensates (component A) used to produce the thermotropic molding compounds according to the invention contain the following recurring structural units without all the structural elements a) to f) necessarily having to occur/be present:

a) aromatic hydrocarboxylic acids b) aromatic aminocarboxylic acids c) diphenols and/or aliphatic diols d) aminophenols e) aromatic dicarboxylic acids and/or aliphatic dicarboxylic acids f) optionally carbonic acid or carbonic acid derivatives, the percentage content of aromatic hydroxycarboxylic acids being 40 to 85 mol-% and preferably 50 to 80 mol-%, the percentage content of aromatic aminocarboxylic acids optionally being 0 to 40 mol-% and preferably 0 to 25 mol-%, the percentage content of diphenols and/or aliphatic diols being 60 to 15 mol-% and preferably 50 to 20 mol-% and the percentage content of aminophenols optionally being 0 to 25 mol-% and preferably 5 to 20 mol-%.

Aromatic dicarboxylic acids and/or aliphatic dicarboxylic acids or carbonic acid equivalents are used in equimolar quantities to the diphenols and/or aliphatic diols and the aminophenols, i.e. 60 to 15 mol-% and preferably 50 to 20 mol-%, the percentage content of carbonate groups being between 0 and 30 mol-%.

Suitable aromatic hydroxycarboxylic acids a) are, for example, compounds corresponding to the following formulae:

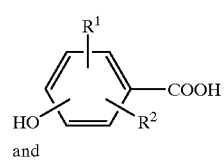

and

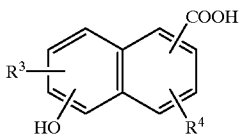

(II)

in which

R¹ to R⁴ represents $C_{1-4}$ alkyl (preferably methyl, ethyl), $C_{1-4}$ alkoxy (preferably methoxy, ethoxy), $C_{6-10}$ aryl or aryloxy (preferably phenyl, phenyloxy, naphthyl, naphthyloxy, biphenyl, biphenyloxy, tolyl, tolyloxy), $C_{7-12}$ alkylaryl (preferably benzyl), halogen (preferably chlorine and bromine) or hydrogen and the valencies between the nucleus and the hydroxyl group and between the nucleus and the carboxyl group form an angle of 45 to 180°.

Preferred aromatic hydroxycarboxylic acids (a) are, for example, 4-hydroxy-3-methylbenzoic acid, 4-hydroxy-3-phenylbenzoic acid, 4-hydroxy-2-ethylbenzoic acid, 3-chloro-4-hydroxybenzoic acid, 3-bromo-4-hydroxybenzoic acid, 4-hydroxy-3-methoxybenzoic acid, 4-hydroxybenzoic acid, 6-hydroxynaphthoic acid, 4-hydroxy-3-phenoxybenzoic acid, 6-hydroxy-5-chloro-2-naphthoic acid, 6-hydroxy-5-methyl-2-naphthoic acid, 6-hydroxy-5-methoxy-2-naphthoic acid, 6-hydroxy-4,7-dichloro-2-naphthoic acid and 2-hydroxybenzoic acid; 4-hydroxybenzoic acid and 6-hydroxynaphthoic acid are particularly preferred.

Suitable optionally substituted 3-hydroxybenzoic acids (a) are, for example, 3-hydroxy-4-methylbenzoic acid, 3-hydroxy-4-phenylbenzoic acid, 3-hydroxy-2-ethylbenzoic acid, 4-chloro-3-hydroxybenzoic acid, 4-bromo-3-hydroxybenzoic acid, 3-hydroxy-4-methoxybenzoic acid, 3-hydroxy-4-phenoxybenzoic acid, 3-hydroxy-2-methoxybenzoic acid and 3-hydroxybenzoic acid.

Particularly preferred aromatic 3-hydroxycarboxylic acids (a) are unsubstituted hydroxycarboxylic acids, such as 3-hydroxybenzoic acid.

Suitable aromatic aminocarboxylic acids b) are, for example, compounds corresponding to the following formulae:

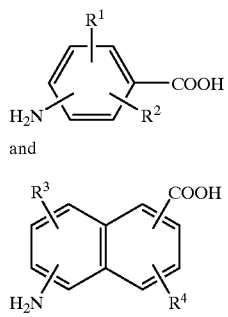

in which

R¹ to R⁴ represents $C_{1-4}$ alkyl (preferably methyl, ethyl), $C_{1-4}$ alkoxy (preferably methoxy, ethoxy), $C_{6-10}$ aryl or aryloxy (preferably phenyl, phenyloxy, naphthyl, naphthyloxy, biphenyl, biphenyloxy, tolyl, tolyloxy), $C_{7-12}$ alkylaryl (preferably benzyl), halogen (preferably chlorine and bromine) or hydrogen and the valencies between the nucleus and the amino group and between the nucleus and the carboxyl group form an angle of 45 to 180°.

Preferred aromatic aminocarboxylic acids are 2-aminobenzoic acid, 3-aminobenzoic acid, 4-aminobenzoic acid, 4-chloroanthranilic acid, 5-chloroanthranilic acid, 3-aminochlorobenzoic acid, 3-amino-4-methylbenzoic acid, 3-amino-4-methylbenzoic acid, 4-amino-3-methylbenzoic acid, 4-amino-3-phenylbenzoic acid, 3-bromo-4-aminobenzoic acid, 4-amino-3-methoxybenzoic acid, 6-aminonaphthoic acid, 4-amino-3-phenoxybenzoic acid, 6-amino-5-chloro-2-naphthoic acid, 6-amino-5-methyl-2-naphthoic acid, 6-amino-5-methoxy-2-naphthoic acid, 6-amino-4,7-dichloro-2-naphthoic acid; 4-aminobenzoic acid and 6-aminonaphthoic acid are particularly preferred.

Particularly preferred aromatic aminocarboxylic acids are 4-aminobenzoic acid, 3-aminobenzoic acid and 6-amino-2-naphthoic acid.

Suitable diphenols c) are those corresponding to the following formula $$HO-Z-OH \qquad (III)$$

in which

Z is a difunctional mononuclear or polynuclear aromatic radical containing 6 to 30 carbon atoms, the structure of Z being such that the two OH groups are each directly attached to a carbon atom of an aromatic system and the two valencies form an angle of 45 to 180°.

The aromatic radicals may be substituted by 1 to 4 $C_{1-4}$ alkyl, $C_{1-4}$ alkoxy, phenyl, phenoxy, benzyl groups or halogen atoms (preferably chlorine and bromine) and, in addition to phenylene, naphthylene and biphenylene, also include phenylene radicals connected by oxygen, sulfur, carbonyl, sulfonyl, $C_{1-4}$ alkylene or alkylidene, cyclohexylene or hexylidene or —O(CH₂)ₙO— with n=2–4.

Preferred diphenols c) are, for example, hydroquinone, 4,4'-dihydroxydiphenyl, 4,4'-dihydroxydiphenyl ether, 4,4'-dihydroxydiphenyl ethane, 4,4'-dihydroxyphenoxyethane, 3,5'-dihydroxydiphenyl, 3,5'-dihydroxydiphenyl ether, 1,5-dihydroxynaphthalene, 2,6-dihydroxynaphthalene, 1,4-dihydroxynaphthalene, chlorohydroquinone, bromohydroquinone, methyl hydroquinone, phenyl hydroquinone, ethyl hydroquinone, 2,2'-dimethyl-4,4'-dihydroxydiphenyl, 3,3',5,5'-tetramethyl-4,4'-dihydroxydiphenyl, 3,5'-dimethoxy-4,4'-dihydroxydiphenyl ether, 1,2-(2-chloro-4-hydroxyphenyl)-ethane, 4-methoxy-2,6-dihydroxynaphthalene, resorcinol, 3,4'-dihydroxydiphenyl, 3,4'-dihydroxydiphenyl ether, 3,4'-dihydroxynaphthalene, 1,7-dihydroxynaphthalene, 2,7-dihydroxynaphthalene, 4-chlororesorcinol, 4-bromoresorcinol, 4-methyl resorcinol, 4-phenyl resorcinol, 4-ethoxyresorcinol, 2,5-dichloro-1,6-dihydroxynaphthalene and 4-methoxy-2,7-dihydroxynaphthalene.

Particularly preferred diphenols c) are hydroquinone and 4,4'-dihydroxydiphenyl.

Suitable aminophenols d) are those corresponding to formula $$HO-Z-NH_2$$

in which

Z is a difunctional mononuclear or polynuclear aromatic radical containing 6 to 30 carbon atoms, the structure of Z being such that the OH group and NH₂ group are each directly attached to a carbon atom of an aromatic system and the two valencies form an angle of 45 to 180°.

The aromatic radicals may be substituted by 1 to 4 $C_{1-4}$ alkyl, $C_{1-4}$ alkoxy, phenyl, phenoxy, benzyl groups or halogen atoms (preferably chlorine and bromine) and, in addition to phenylene, naphthylene and biphenylene, also include phenylene radicals connected by oxygen, sulfur, carbonyl, sulfonyl, $C_{1-4}$ alkylene or alkylidene, cyclohexylene or hexylidene or —O(CH$_2$)$_n$O— with n=2–4.

Preferred aminophenols are 3-aminophenol, 5-amino-2-chlorophenol, 4-aminophenol, 3-amino-2-methylphenol, 3-amino-4-methylphenol, 5-amino-1-naphthol, 6-amino-1-naphthol, 5-amino-2-naphthol, 7-amino-2-naphthol, 8-amino-2-naphthol, 6-amino-2-naphthol, 4-amino-1-hydroxybiphenyl.

Suitable aromatic dicarboxylic acids e) are those corresponding to the formula

HOOC—A—COOH (IV)

in which
A is a difunctional aromatic radical containing 6 to 24 carbon atoms and preferably 6 to 16 carbon atoms, the two valencies forming an angle of 45 to 180°. The difunctional aromatic radicals may be substituted by 1 to 4 $C_{1-4}$ alkyl, $C_{1-4}$ alkoxy, phenyl, phenoxy, benzyl groups or halogen atoms (preferably chlorine and bromine) and, in addition to phenylene, naphthylene and biphenylene, also include phenylene radicals connected by oxygen, sulfur, carbonyl, sulfonyl, $C_{1-4}$ alkylene or alkylidene, cyclohexylene or hexylidene or —O(CH$_2$)$_n$O— with n=1–4.

Preferred aromatic radicals are, for example, 1,4-phenylene, 1,4-naphthylene or 4,4'-biphenylene, in which the two bonds extend coaxially in opposite directions, or 1,5-naphthylene, 2,6-naphthylene or 3,5'-bisphenylene, in which the two bonds pointing in opposite directions are displaced parallel to one another, and 1,3-phenylene, 1,3-, 1,6-, 1,7- or 2,7-naphthylene or 3,4-bisphenylene, in which the two bonds are not situated at adjacent atoms and do not extend coaxially or parallel-displaced in opposite directions.

Preferred aromatic dicarboxylic acids e) are, for example, 1,4-naphthalene dicarboxylic acid, 1,5-naphthalene dicarboxylic acid, 2,6-naphthalene dicarboxylic acid, biphenyl-4,4'-dicarboxylic acid, biphenyl-3,3'-dicarboxylic acid, diphenoxyethane-4,4'-dicarboxylic acid, diphenylether-4,4'-dicarboxylic acid, methyl terephthalic acid, methoxyterephthalic acid, chloroterephthalic acid, 4-chloronaphthalene-2,7-dicarboxylic acid, 1,3-naphthalene dicarboxylic acid, 1,6-naphthalene dicarboxylic acid, 1,7-naphthalene dicarboxylic acid, 2,7-naphthalene dicarboxylic acid, biphenyl-3,4'-dicarboxylic acid, diphenylether-3,4'-dicarboxylic acid, 4-methyl isophthalic acid, 5-methyl isophthalic acid, diphenylether-4,4'-dichloro-3,3'-dicarboxylic acid, isophthalic and terephthalic acid.

Particularly preferred aromatic dicarboxylic acids e) are isophthalic and terephthalic acid.

Derivatives for incorporation of the f) carbonate groups are diaryl carbonates, such as diphenyl carbonate, ditolyl carbonate, phenyl tolyl carbonate and dinaphthalene carbonate; dialkyl carbonates, such as diethyl carbonate, dimethyl carbonate, dimethyl dicarbonate and diethyl dicarbonate, and also glycol carbonate or neopentyl carbonate.

A preferred derivative for incorporation of the f) carbonate groups is diphenyl carbonate.

Examples of aliphatic diols c) are ethylene glycol, propylene glycol, butanediol, hexanediol, decanediol, cyclohexane dimethanol, cyclohexanediol, dimer fatty alcohols, etc. In addition, component c) may be derived from alkylene ether glycols, such as diethylene glycol, triethylene glycol, polyethylene glycol or ethoxylated or propoxylated bisphenols.

Examples of aliphatic carboxylic acids e) are propane dicarboxylic acid, butane dicarboxylic acid, pentane dicarboxylic acid, malonic acid, glutaric acid, sebacic acid, aliphatic dicarboxylic acids, such as cyclohexane dicarboxylic acid, dimer fatty acids.

The quantities of catalyst are preferably from 0.001 to 1% by weight and, more preferably, from 0.01 to 0.2% by weight, based on the total weight of the monomers used.

The thermotropic polycondensates (component A) have molecular weights (number average) of greater than 8,500 g/mol and preferably greater than 10,000 g/mol (as determined by GPC gel permeation chromatography).

The polyesters may be prepared at temperatures of 150 to 380° C., the reaction generally being started at low temperatures and the reaction being continuously increased as the reaction progresses. If the reaction rate decreases, a vacuum may be applied, the pressure preferably being reduced continuously from normal pressure to around 0.1 mbar.

In the production of the thermotropic polycondensates according to the invention, the liquid crystalline compounds may be added at any time until a degree of elimination of 95% of volatile polycondensation product is reached. The liquid crystalline compounds are preferably added at the beginning of the weighing in of the monomer units.

The thermotropic polycondensates according to the invention are distinguished by increased thermal stability and by excellent melt viscosity stability under processing conditions.

The production of LC polycondensates is described in detail in the patent literature, for example in DE-OS 3 923 294, DE-OS 3 629 211, DE-OS 3 736 991, EP-A 345 869, EP-A 0 221 316.

In the context of the invention, functionalized polymers (component B) are understood to be polymers which are capable of further reactions. Accordingly, the functionalized polymers are substances which have reactive terminal groups or corresponding groups along the main polymer chain. Examples of reactive groups are double or triple bonds, amino, glycidyl, hydroxy, carboxy, carbonate, amide, ester, anhydride or urethane groups. Preferred reactive groups are carboxy, ester, anhydride, hydroxy groups or glycidyl groups.

Examples of compounds for component B are polyvinyl alcohol, polyvinyl acetate, polyvinyl acetals, polyvinyl propionate, poly(meth)acrylates, styrene (meth)acrylate copolymers or copolymers such as, for example, partially hydrolyzed polyvinyl acetate or vinyl chloride copolymers.

Further examples of compounds for component B are functionalized polybutadiene oils or silicone oils or silanes, preferably functionalized with carboxyl, hydroxyl or amino groups.

Copolymers of ethylene/(t-alkyl)acrylate, ethylene/glycidyl acrylate, allyl glycidyl ether, (t-alkyl)acrylate, ethylene/acrylic acid (ester)/maleic anhydride or ethylene/maleic anhydride may also be used.

The copolymers used in accordance with the present invention have the following composition:
a) 40 to 100% by weight of at least one α-olefin containing 2 to 8 carbon atoms
b) 0 to 50% by weight of a diene,
c) 0 to 45% by weight of a primary or secondary $C_{1-12}$ alkyl ester of acrylic or methacrylic acid or mixtures of such esters,
d) 0 to 45% by weight of an olefinically unsaturated mono- or dicarboxylic acid, which may even be completely or partly present in salt form, and/or a functional derivative of such an acid,
e) 0 to 40% by weight of an epoxyfunctional monomer.

The components B) are either commercially obtainable products or substances which may be produced by known methods (cf. Houben Weyl, Methoden der organischen Chemie, Vol. 14/1 (1961), Vol. 14/2 (1963) or Vol. E20 (1987) or Ullmanns Encyklopädie der technischen Chemie, 3rd Edition 1963, Vol. 14). They have an average molecular weight $\overline{M}_w$ of greater than 1,000 g/mol (as determined by GPC).

The percentage content of component B) in the thermotropic molding compound is generally from 0.02 to 5% by weight, preferably from 0.05 to 3% by weight and more preferably from 0.1 to 2% by weight.

The thermotropic molding compounds according to the invention may be mixed with up to 80% by weight, preferably 1 to 75% by weight and, more preferably, 30 to 70% by weight, based on the total weight of the filled compounds, of reinforcing materials and/or fillers. Suitable reinforcing materials and/or fillers are glass fibers, carbon fibers, mica, synthetic silica, kaolin, calcium silicate, feldspar, chalk and light metals, such as aluminium and magnesium.

In addition, dyes or pigments, such as carbon black, titanium dioxide, cadmium sulfide, ultramarine blue or phthalocyanine dyes, may be added in quantities of up to 10% by weight for certain applications.

The thermotropic molding compounds according to the invention are obtained from a mixture of thermotropic polycondensates and the functionalized polymers mentioned above in a processing unit, for example an extruder or kneader.

Moldings of excellent rigidity and toughness, very high heat resistance and good dimensional stability can be produced from the thermotropic molding compounds.

Since the thermotropic molding compounds are extremely resistant to chemicals and highly flame-resistant, they are particularly suitable for the production of

- electrical articles, such as insulators, printed circuits, plug contacts or armature components
- parts of chemical engineering equipment, such as pipes, reactors, vessel linings, antifriction bearings or seals
- parts for the fitting out of aircraft
- parts of medical equipment and components of air conditioning installations and valves.

EXAMPLES

The invention is illustrated by the following Examples.

Granules of an LC polyester—synthesized from 75 mol-% p-hydroxybenzoic acid, 25 mol-% 4,4-dihydroxydiphenyl, 15 mol-% terephthalic acid and 10 mol-% isophthalic acid—are used as component A) in Examples 1 to 11 and in the Comparison Example. Melt viscosity: 110 Pa.s at 330° C. and at a shear rate of $1,000\ s^{-1}$, Functionalized polymers are used as component (B) (see Table 3).

The granules of the LC polyester are either suspended in a solution of the particular functionalized polymer and extruded after removal of the solvent or, given suitable functionalized polymers, the extruder is simultaneously charged with the LC polymer and the functionalized polymer.

It was not possible to extract the functionalized polymers from the thermotropic molding compounds according to the invention with suitable solvents (toluene and methylene chloride) after compounding (48 hours' heating under reflux).

The addition of component B comprises 0.8% by weight in Examples 1 to 9 and 0.4% by weight in Examples 10 and 11.

The flexural tests were carried out in accordance with DIN 53 452 on 80×40×4 mm test specimens.

It can be seen from the Table that the Examples according to the invention have better mechanical properties than the Comparison Example.

Components B Used

Epolene® E 43: Emulsifiable polypropylene wax having an acid value of 47 and a molecular weight (GPC) $\overline{M}_n \approx 3,900$ and $\overline{M}_w \approx 9,100$ (a product of Eastman Chemical Company)

Epolene® E 14: Polyethylene wax having an acid value of 16 and a molecular weight (GPC) $\overline{M}_n \approx 1.300$ and $\overline{M}_w \approx 3,600$ (a product of Eastman Chemical Company)

Dylark® 250: Styrene/maleic anhydride copolymer having a melt flow index (MFI) of 0.9 g/10 mins. (a product of Arco Chemical).

Polybond® 1000: Graft copolymer of polypropylene homopolymer and acrylic acid, acrylic acid content approx. 6% by weight (a product of Krahn Chemie GmbH)

Lucalen® A 2020: A terpolymer of 4% acrylic acid, butyl acrylate and ethylene having a melt index (190/2.16) of 6 to 8 g/10 mins. (a product of BASF).

Lotader® AX 8660: Terpolymer of ethylene, butyl acrylate and approx. 2% glycidyl methacrylate having a melting point of approx. 76° C. (a product of Orkem, Norsolor S.A.).

Polybond® 1021: Polypropylene/acrylic acid copolymer having a melt index (230/2.16) of 40 g/10 mins. and a melting point of 146° C. (a product of Krahn Chemie GmbH).

Polyvest® C 75 and C 150: Carboxyfunctionalized polybutadienes having molecular weights ($M_n$) of approx. 1,700 and acid values of 75 and 150 (products of Hüls AG).

TABLE 1

| Example | Component B | Quantity % by wt. | Flexural strength N/mm² | Modulus N/mm² | Impact strength KJ/m² | Outer fiber strain [%] |
|---|---|---|---|---|---|---|
| Comp. | — | — | 154 | 16,400 | 25 | 2.6 |
| 1 | Lucalen A 2920 | 0.8 | 172 | 18,800 | 57 | 3 |
| 2 | Epolene E 14 | 0.8 | 170 | 19,500 | 72 | 2.9 |
| 3 | Dylark 250 | 0.8 | 170 | 18,900 | 75 | 2.8 |
| 4 | Lotader AX 8660 | 0.8 | 169 | 18,300 | 58 | 3.5 |
| 5 | Epolene E 43 | 0.8 | 181 | 19,900 | 97 | 3.4 |
| 6 | Polybond 1000 | 0.8 | 159 | 14,900 | 54 | 4.4 |
| 7 | Polybond 1021 | 0.8 | 156 | 14,200 | 62 | 4.3 |
| 8 | Polyvest C 150 | 0.8 | 170 | 19,200 | 67 | 3 |
| 9 | Polyvest C 75 | 0.8 | 171 | 19,800 | 62 | 2.9 |
| 10 | Polyvest C 150 | 0.4 | 173 | 19,900 | 65 | 2.9 |
| 11 | Polyvest C 75 | 0.4 | 170 | 19,300 | 73 | 2.7 |

Surface Quality

The sheets are light in color with no marbling while the comparison test shows the surface marbling typical of LC's.

What is claimed is:

1. A thermoplastically processable molding compound consisting of:
    A) a thermotropic polycondensate containing the following structural units:
        a) 40–85 mol % aromatic hydrocarboxylic acid units;
        b) 0–40 mol % aminocarboxylic acid units;
        c) 15–60 mol % of diphenol units and/or aliphatic diol units;
        d) 0–25 mol % aminophenol units;
        e) 15–60 mol % aromatic dicarboxylic acid units and/or aliphatic dicarboxylic acid units; and f) 0–30 mol % carbonic acid units or carbonic acid derivative units;

B) 0.02 to 2% by weight, based on 100% by weight of A, of a functionalized polymer comprising a copolymer of:
  a) 40 to 100% by weight of at least one alpha olefin containing 2–8 carbon atoms;
  b) 0 to 50% by weight of a diene;
  c) 0 to 45% by weight of a primary or secondary $C_{1-12}$ alkyl ester or acrylic or methacrylic acid or mixtures of such esters;
  d) 0 to 45% by weight of an olefinically unsaturated mono- or dicarboxylic acid, which may be completely or partially in salt form, or a functional derivative thereof; and
  e) 0 to 40% by weight of an epoxyfunctional monomer; and C) optionally, reinforcing materials, fillers, pigments, or dyes.

2. The molding compound of claim 1, wherein B is a polycarboxyfunctional polypropylene wax.

3. The molding compound of claim 2, wherein the polypropylene wax has an acid number of about 47.

4. The molding compound of claim 1, prepared by extrusion of thermoplastic polycondensate A) with functionalized polymer B).

5. The molding compound of claim 1, wherein B contains reactive terminal groups or corresponding groups along a main polymer chain.

6. The molding compound of claim 5, wherein the reactive terminal or corresponding groups are selected from the group cosisting of double bonds, triple bonds, amino groups, glycidyl groups, hydroxy groups, carbonate groups, amide groups, carboxy groups, ester groups, anhydride groups and urethane groups.

7. The molding compound of claim 6, wherein the reactive terminal or corresponding groups are selected from the group consisting of carboxy groups, ester groups, anhydride groups, hydroxy group and glycidyl groups.

8. The molding compound of claim 1, wherein B has an average molecular weight of at least 1,000 g/mol.

9. The molding compound of claim 1, wherein A has an average molecular weight of at least 8,500 g/mol.

10. A modified thermoplastically processable thermotropic molding compound consisting essentially of a compound prepared by an extrusion of:

A) a liquid crystalline polymer containing at least one of:
  a) an aromatic hydrocarboxylic acid;
  b) an aromatic aminocarboxylic acid;
  c) a diphenol and/or an aliphatic diol;
  d) an aminophenol;
  e) an aromatic and/or aliphatic dicarboxylic acid; and
  f) a carbonic acid or carbonic acid derivative, with B) about 0.02 to 2% by weight, based on 100% by weight of the liquid crystalline polymer, of a functionalized polymer comprising a copolymer of:
  a) 40 to 100% by weight of at least one alpha olefin containing 2–8 carbon atoms;
  b) 0 to 50% by weight of a diene;
  c) 0 to 45% by weight of a primary or secondary $C_{1-12}$ alkyl ester or acrylic or methacrylic acid or a mixture of the esters;
  d) 0 to 45% by weight of an olefinically unsaturated mono- or dicarboxylic acid, which may be completely or partially in salt form, or a functional derivative thereof; and
  e) 0 to 40% by weight of an epoxy functional monomer, wherein B contains along a main polymer chain, reaction terminal groups or corresponding groups, selected from the group consisting of double bonds, triple bonds, amino groups, glycidyl groups, hydroxy groups, carbonate groups, amide groups, carboxy groups, ester groups, anhydride groups and urethane groups.

11. The molding compound of claim 10 wherein the liquid crystalline polymer is a liquid crystalline polyester.

12. A modified thermoplastically processable thermotropic molding compound consisting of a compound prepared by an extrusion of:

A) a liquid crystalline polymer containing at least one of:
  a) an aromatic hydrocarboxylic acid;
  b) an aromatic aminocarboxylic acid;
  c) a diphenol and/or an aliphatic diol;
  d) an aminophenol;
  e) an aromatic and/or aliphatic dicarboxylic acid; and
  f) a carbonic acid or carbonic acid derivative, with B) about 0.02 to 2% by weight, based on 100% by weight of the liquid crystalline polymer, of a functionalized polymer comprising a copolymer of:
  a) 40 to 100% by weight of at least one alpha olefin containing 2–8 carbon atoms;
  b) 0 to 50% by weight of a diene;
  c) 0 to 45% by weight of a primary or secondary $C_{1-12}$ alkyl ester or acrylic or methacrylic acid or a mixture of the esters;
  d) 0 to 45% by weight of an olefinically unsaturated mono- or dicarboxylic acid, which may be completely or partially in salt form, or a functional derivative thereof; and
  e) 0 to 40% by weight of an epoxyfunctional monomer, and C) optionally, an addition of a reinforcing material, a filler, a dye, a pigment or a mixture thereof.

13. The molding compound of claim 12, wherein up to 80% by weight, based on the total weight of the molding compound, of the reinforcing material and/or the filler is present.

14. The molding compound of claim 13, wherein 1 to 75% by weight, based on the total weight of the molding compound, of the reinforcing material and/or the filler is present.

15. The molding compound of claim 14, wherein 30 to 70% by weight, based on the total weight of the molding compound, of the reinforcing material and/or the filler is present.

16. The molding compound of claim 12, wherein the reinforcing material and/or the filler are glass fibers, carbon fibers, mica, synthetic silica, kaolin, calcium silicate, feldspar, chalk, or a light metal.

17. The molding compound of claim 16, wherein the light metal is aluminum or magnesium.

18. The molding compound of claim 12, wherein up to 10% by weight, based on the total weight of the molding compound, of the dye and/or the pigment is present.

19. The molding compound of claim 12, wherein the dye and/or pigment are carbon black, titanium dioxide, cadmium sulfide, ultramarine blue, or a phthalocyanine dye.

20. The molding compound of claim 12, wherein the liquid crystalline polymer is a liquid crystalline polyester.

* * * * *